(12) United States Patent
Conrad (10) Patent No.: US 9,682,844 B2
(45) Date of Patent: Jun. 20, 2017

(54) CHAIN DRIVE UNIT

(71) Applicant: GARAVENTA LIFTECH AG, Küssnacht (CH)

(72) Inventor: Hans-Martin Conrad, Rothenburg (CH)

(73) Assignee: GARAVENTA LIFTECH AG, Küssnacht (CH)

( * ) Notice: Subject to any disclaimer, the term of this patent is extended or adjusted under 35 U.S.C. 154(b) by 99 days.

(21) Appl. No.: 14/552,157

(22) Filed: Nov. 24, 2014

(65) Prior Publication Data

US 2015/0158700 A1 Jun. 11, 2015

(30) Foreign Application Priority Data

Dec. 6, 2013 (EP) ..................................... 13196063

(51) Int. Cl.
| | |
|---|---|
| *F16H 7/06* | (2006.01) |
| *B66B 7/06* | (2006.01) |
| *B66B 9/00* | (2006.01) |
| *B66B 11/08* | (2006.01) |
| *B66F 7/28* | (2006.01) |
| *B66D 3/26* | (2006.01) |
| *B66F 9/02* | (2006.01) |
| *F16H 55/30* | (2006.01) |

(52) U.S. Cl.
CPC ................ *B66B 7/066* (2013.01); *B66B 9/00* (2013.01); *B66B 11/08* (2013.01); *B66D 3/26* (2013.01);
(Continued)

(58) Field of Classification Search
CPC .. B66B 9/00; B66B 7/066; B66F 7/28; B66D 3/26; F16H 7/0829; F16H 2007/185; F16H 2055/306; F16G 13/18
(Continued)

(56) References Cited

U.S. PATENT DOCUMENTS 4,738,654 A * 4/1988 Cole, Jr. ................... F16H 9/24
474/219
5,427,580 A * 6/1995 Ledvina .................... F01L 1/02
474/84
(Continued)

FOREIGN PATENT DOCUMENTS

| DE | 4435480 A1 | 4/1995 |
|---|---|---|
| EP | 0825360 A2 | 2/1998 |
| EP | 0987466 A1 | 3/2000 |

OTHER PUBLICATIONS

European Search Report issued in European Pat. Appl. No. 13 19 6063 dated Feb. 18, 2014.

*Primary Examiner* — William E Dondero
*Assistant Examiner* — Mark K Buse
(74) *Attorney, Agent, or Firm* — Marshall, Gerstein & Borun LLP (57) ABSTRACT

A chain drive unit (4, 5, 6) for reducing chain vibrations comprising a chain wheel unit (43) with at least two sprockets (431, 432) that are arranged parallel on a common rotation axle, at least two parallel chains (51, 52) engaging these sprockets (431, 432). At least one damping element (6) connecting two adjoining chains (51, 52). The circumferential orientation of two adjoining sprockets (431, 432) differs by a partial pitch (pP) and the damping element (6) comprises a first fixation (61) on its one free end for the lateral fixation to the first chain (51), a second fixation (62) on its opposite free end for the lateral fixation to the second chain (52) and a force transmission unit (63, 8, 9) arranged between the first and the second fixation transmitting an applied force from the first fixation (61) to the second fixation (62) and vice versa.

14 Claims, 7 Drawing Sheets

(52) U.S. Cl.
CPC ................. *B66F 9/02* (2013.01); *F16H 7/06* (2013.01); *F16H 2055/306* (2013.01); *Y10T 74/1884* (2015.01)

(58) Field of Classification Search
USPC .............................................. 474/84, 85, 219
See application file for complete search history.

(56) References Cited

U.S. PATENT DOCUMENTS

| | | | | |
|---|---|---|---|---|
| 5,437,581 A | * | 8/1995 | Ledvina | F01L 1/02 123/90.31 |
| 5,470,282 A | * | 11/1995 | Ledvina | F01L 1/02 474/156 |
| 5,562,557 A | * | 10/1996 | Ledvina | F01L 1/02 474/84 |
| 5,816,967 A | * | 10/1998 | Ledvina | F01L 1/02 474/84 |
| 5,846,149 A | * | 12/1998 | Ledvina | F01L 1/02 474/84 |
| 5,980,406 A | * | 11/1999 | Mott | F16H 7/06 474/152 |
| 6,106,425 A | * | 8/2000 | Mott | F16H 13/02 474/156 |
| 2008/0070732 A1 | * | 3/2008 | Ledvina | F16G 13/04 474/206 |
| 2010/0089845 A1 | * | 4/2010 | Fassler | B66F 7/28 211/1.57 |

* cited by examiner

CHAIN DRIVE UNIT

CROSS-REFERENCE TO RELATED APPLICATIONS

The present application claims the benefit of priority under 35 U.S.C. 119 of European Patent Application EP 13196063.5, filed Dec. 6, 2013, the entire disclosure of which is hereby incorporated by reference herein, in its entirety and for all purposes.

TECHNICAL FIELD

The present invention relates to a chain drive unit, in particular for a roller chain, with at least one driven chain wheel, chains engaging said chain wheels and at least one damping element for damping chain vibrations.

BACKGROUND

The drive unit for lifting systems usually comprises wires, tooth belts or chains.

Chain drives become acoustically or physically noticeable when the chain is caused to vibrate. The most common cause for such vibrations is the so called polygon effect that occurs, when the drive wheel engages with the chain in a form-fit. Since the chain cannot continuously roll-on or -off the drive wheel, angular offsets of the chain occur, so that the drive wheel forms a polygon. As a result, vibrations in the longitudinal and the transversal direction of the chain occur.

Usually, to prevent these vibrations, chains with a small pitch, chain wheels with an increased number of teeth or other means like wires, tooth chains or tooth belts are being used. In comparison to roller chains, tooth chains are very expensive and tooth belts have a limited life time.

SUMMARY OF THE DISCLOSURE

It is therefore a task of the current invention to provide a simple, easy to install and cost-effective damping element that suppresses the undesired vibrations of a chain drive.

This task is solved by a chain drive unit with the features of claim 1, a damping element with the features of claim 9 and a method with the features of claim 10.

Chain drives, especially for lifting units, for security reasons, must comprise two chains, each of which being able to carrying out the lifting on its own. The current invention uses the existence of the second chain to its advantage.

Usually there are two chains per chain drive unit, in some cases; more than two chains are indicated. In the cases, where there are more than two chains, the following is true for each pair of adjacent chains. The general expression chain includes simplex-, duplex-, triplex- or other multiplex-chains.

The chain drive unit for damping chain vibrations according to the invention comprises a chain wheel unit with at least two sprockets that are arranged parallel on a common rotation axle, at least two parallel chains engaging these sprockets and at least one damping element connecting two adjoining chains.

The circumferential orientation of two adjoining sprockets differs by half a pitch, if there are two chains in total. If there are three chains, the difference between two adjoining sprockets is a third of a pitch. In general, the circumferential orientation of two adjoining sprockets differs by a partial pitch. The partial pitch being defined by one divided by the number of sprockets times a sprocket's pitch.

In cases with more than two sprockets, for example three, the sprockets can be arranged as such that the difference between the first and the second and the second and the third sprocket is a third of a pitch. Alternatively, the sprockets can be arranged as such that the difference between the first and the second sprocket is two third of a pitch and the difference between the second and the third sprocket is one third of a pitch. However, the sum of all the absolute partial pitches is an integer. The absolute partial pitch of a specific sprocket being defined by the difference between the circumferential orientation of the first sprocket compared to the one of the specific sprocket.

By doing so, the vibrations in the adjoining chains are out of phase with one another. In the case with two sprockets, the angular phase shift is 180 degrees and in the case with three sprockets 120 degrees. In general, the angular phase shift is 360 degrees divided by the number of sprockets.

In the case with multiplex-chains, the above-stated is true between two adjoining multiplex-chains and their corresponding sprockets.

In the case with two sprockets, the distance between two adjoining teeth, when considering both chains, is only half a pitch. In order to achieve this with a single tooth wheel, the pitch would have to be halved, which would lead to smaller teeth, which would lead to a smaller load capacity.

With the design according to the invention, a smaller effective pitch, while maintaining the individual pitch and the individual tooth size of each chain wheel is obtained.

The damping element comprises a first fixation on its one free end for the lateral fixation to the first chain, a second fixation on its opposite free end for the lateral fixation to the second chain and a force transmission unit arranged between the first and the second fixation transmitting an applied force from the first fixation to the second fixation and vice versa. The force transmission unit can comprise a single element or a plurality of elements.

This design allows the use of simple elements that can be easily attached to the chains, without its life time being restricted by friction wear. The purpose of these elements is to transmit forces from one chain to an adjoining one in a distributed manner along the chain length. The position and the distance between two adjoining damping elements may differ depending on the applied load, the chain's speed and length and type.

Preferably, the position of the first fixation on one of the chains differs to the position of the second fixation on the other chain in a longitudinal direction of the chain's movement by a sprocket's pitch (P) divided by the number of sprockets or by a multiple thereof. Preferably, for a uniform distribution in general, the position of the first fixation differs to the position of the second fixation by (the number of sprockets*n+1) times the partial pitch (pP). Preferably, in the case with two sprockets, the position of the first fixation differs to the position of the second fixation by half a pitch (P) or by (2*n+1) times half a pitch, wherein n is an integer. With this design, identical fixations can be used on either of the two adjoining chains, which is easier in manufacturing. However, as an alternative, damping elements with non-identical fixations can be used in order to realise a difference of the first fixation to the second fixation of zero or a multiple of a pitch. However, any other irregular distribution is also possible.

Preferably the distance between these two positions is half a pitch, one and a half pitch or two and a half pitch. Bigger distances are thinkable but are more likely to cause problems when moving around the chain wheel. The different distances between these two positions allow the use of different damping elements with different behaviour. For example, a longer element might be more flexible than a shorter one or a stronger element can be used while maintaining the flexibility of a corresponding weaker element.

Preferably the force transmission unit comprises arc-shaped leaf springs or magnets or tension or pressure springs.

The leaf spring design has the advantage that the force transmission unit can be produced as a single piece from the same material as the two adjoining fixations. Deviations from the original distance between the two positions of the fixations as well as angular deviations when circling around the chain wheel are absorbed by the leaf spring.

A force transmission unit with magnets provides a touchless connection between the two fixations. On each of two adjoining chains, a magnet is fixed to said chain, while the magnet being fixed to the first chain does not contact the one being fixed to the second chain, allowing a damper to "float" on the chain pivot points, eliminating stress while passing through the sprockets. This is advantageous in view of the positional and angular deviations, as the magnets simply move away from one another and no additional stress is induced.

The design with the tension or pressure spring is a valuable alternative to the leaf spring. Although being more complex, these springs have a very high life time in view of fatigue.

Independent from the embodiments, the damping element can be installed in various directions, transmitting longitudinal and/or lateral forces from the first chain to the adjacent second chain. In one embodiment, all damping elements have the same orientation, i.e. all the force transmission units are oriented parallel to or opposite to the longitudinal direction. In another way, different damping elements have a different orientation, i.e. some of the force transmission units are oriented parallel to the longitudinal direction and some are oriented opposite to the longitudinal direction.

Also independent from the embodiments are the number of damping elements per chain drive unit and the spacing between two adjoining damping elements. Preferably there is a damping element every tenth to hundredth pitch, more preferably every thirties to seventieth pitch, more preferably every fiftieth pitch.

In a preferred embodiment, the first fixation comprises a first clip with two opposing clamping jaws for clamping an outer link plate of the first chain and a second clip with two opposing clamping jaws for clamping an outer link plate of the second chain. The clamping jaws provide a simple and secure means for clamping the damping element to the chains. Alternatively, damping elements with only one clamping jaw can be used or the fixation is attached to the chains by means of a magnet or by means of a combination of a clamping jaw and a magnet.

Preferably, the damping element further comprise a flap on its free ends adjacent to the first and second clamping jaws for abutting against an adjacent pin of the corresponding chain. These flaps on either free end of the damping element control the engagement of a clip with a corresponding link plate by providing a tension that holds the damping element in place securely and additionally provide a means for transmitting a force from one chain to the other one.

In another preferred embodiment, the first and second fixation comprises at least one magnet reception with a shoulder, a corresponding pin reception and a corresponding magnet. The pin reception is adapted to receive a pin from the first chain and is aligned with the corresponding magnet reception that is adapted to receive the corresponding magnet. The magnet reception comprises a shoulder, on which the magnet rests. The pin reception can form a single recess together with the magnet reception or they can be separate from one another. The magnet reception is conically widening towards the outside, allowing the magnet to be inserted easily. The magnet, on both cases, can be in contact with the pin or can be arranged at a distance thereto.

In such an embodiment, the force transmission unit comprises a common housing comprising the first and second fixation. In order to compensate for some relative movement in the longitudinal direction between two adjoining chains, there is some clearance in the pin reception between the pin and the walls of the pin reception surrounding said pin. As the connection between the magnet and the pin is not fixed, some relative movement in the lateral direction between two adjoining chains is compensated in that the magnet moves away from the pin.

In a preferred embodiment, the chains are roller chains. Alternatively link chains with torus-shaped links might be used.

Preferably, a lifting system using a chain drive unit according to the invention further comprises a holding frame with guiding elements arranged thereon for the guiding of a lifting element arranged thereon and a weight compensation, wherein the lifting element is connected to the weight compensation by means of the chain drive unit.

The holding frame ensures a solid fixation to the surrounding and provides a solid base for the lifting element. Depending on the application, the frame is installed vertically or inclined. Such a holding frame allows a versatile application of this system.

Using a weight compensation to compensate the weight of the lifting element allows the use of a smaller drive, as only the additional weight of goods to be conveyed or people to be transported needs to be moved by said drive.

In a preferred embodiment, the chain drive unit is arranged on top of the holding frame. This design is advantageous as an open chain can be used that is on one side connected to the lifting element and on the other side connected to the weight compensation. The chain is guided over and supported by the chain wheel unit, providing a simple and easy to install system. Alternatively, the chain drive unit can be installed at the bottom or the middle of the holding frame or even adjacent to it together with a chain that forms a closed loop.

Preferably, a damping element to be used in a chain drive unit comprises a first fixation on its one free end for the lateral fixation to the first chain, a second fixation on its opposite free end for the lateral fixation to the second chain and a force transmission unit arranged between the first and the second fixation transmitting an applied force from the first fixation to the second fixation and vice versa.

Newly built or existing lifting systems can be equipped with a chain drive unit according to the invention by providing a chain wheel unit with at least two sprockets whose circumferential orientation differs by half a pitch, providing a chain unit with at least two parallel chains whose member's positions differ by half a pitch, providing chain fixation elements for attaching a lifting element on one free end of the chain unit and a weight compensation on the opposite free end thereof and providing at least one damping element that comprises a first fixation on its one free end for the lateral fixation to the first chain, a second fixation on its opposite free end for the lateral fixation to the second chain and a force transmission unit arranged between the first and the second fixation transmitting an applied force from the first fixation to the second fixation and vice versa.

Further embodiments are stated in the dependent claims.

SHORT DESCRIPTION OF THE DRAWINGS

Preferred embodiments of the invention are described hereinafter with reference to the drawings which are used only for the explanation and are not to be interpreted restrictively. The drawings show in.

DETAILED DESCRIPTION

Figure 1:
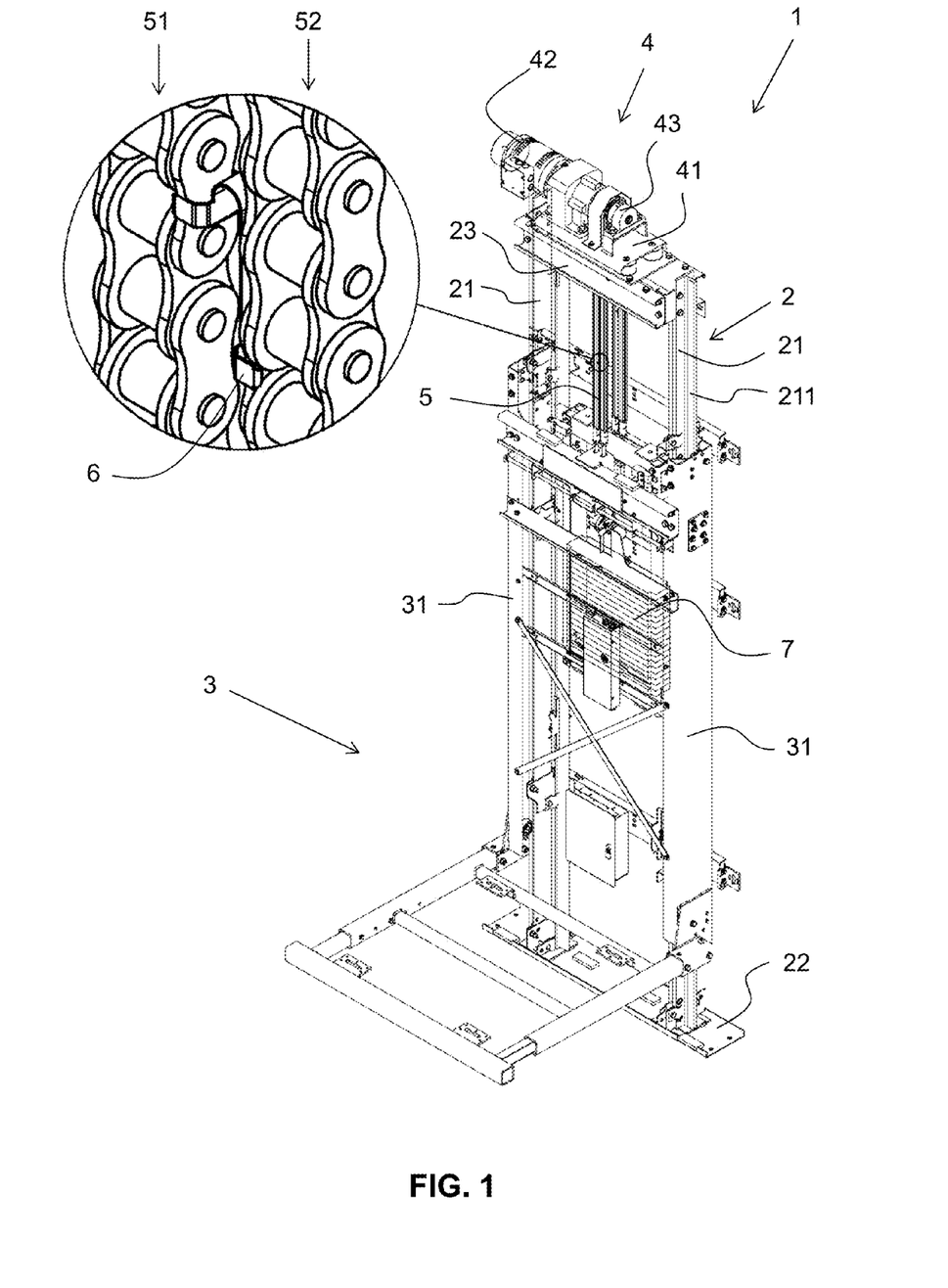
FIG. 1 is a perspective view of an embodiment of a lifting system according to the invention.

FIG. 1 shows a perspective view of an embodiment of a lifting system 1 according to the invention. The lifting system's 1 main components are a holding frame 2, a lifting element 3, a chain drive unit comprising a drive unit 4, a chain unit 5 and damping elements 6, and a weight compensation 7.

The holding frame 2 comprises a side frame 21 on either side of the frame, the side frames 21 being mounted on a lower cross connection 22 serving as a base plate to fix the holding frame 2 on the ground and connecting the side frames 21 to one another in the lower region of the holding frame 2. The holding frame 2 further comprises upper cross connections 23 connecting the side frames 21 to one another in the upper region of the holding frame 2. The upper cross connections 23 serve as a base for the arrangement of the drive unit 4. Sideways and outward facing guiding means 211 are mounted on each of the side frames 21 for guiding the lifting element 3.

The lifting element 3 comprises a lifting frame 31 that is connected to the holding frame 2 by guiding means 211. In this embodiment, the lifting frame 31 in essence, is L-shaped, its vertical arm being in sliding contact with the holding frame 2 and its horizontal arm forming a base for a platform or a cabin.

The drive unit 4 comprises a drive plate 41 a drive 42 mounted on said drive plate 41 and a chain wheel unit 43 mounted in line with said drive 42 on side drive plate 41 and connected to said drive 42 for transmitting a rotational movement generated by the drive 42 via said chain wheel unit 43 to the chain unit 5 engaging said chain wheel unit 43. The drive unit 4 is mounted on the holding frame 2 by means of the drive plate 41.

Figure 2:
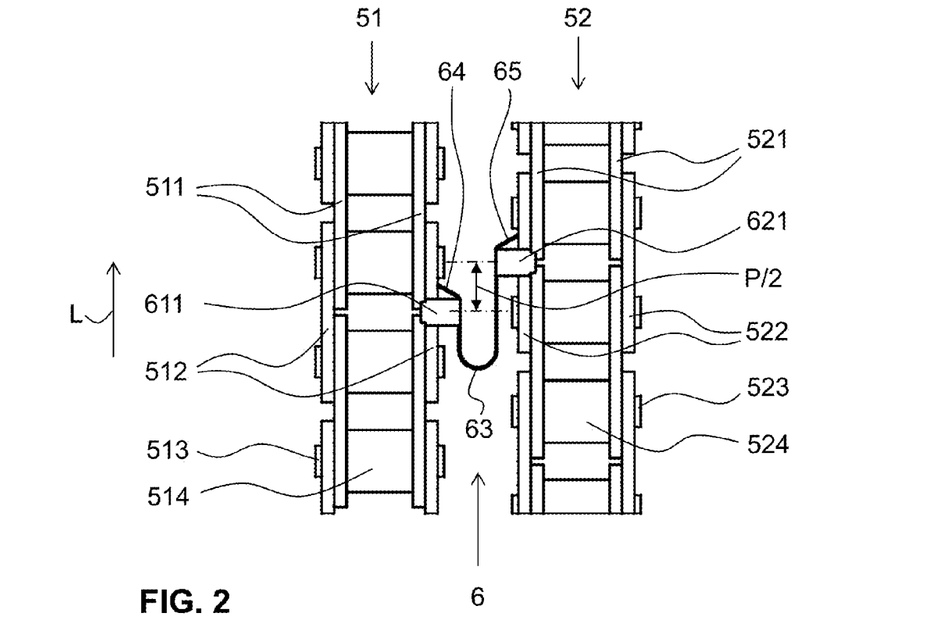
FIG. 2 is a front view of a first embodiment of the chains and the damping elements of a chain drive unit according to the invention.

The chain unit 5, in this embodiment, as can be seen in FIGS. 2 to 5, comprises a first chain 51 and a second chain 52 and damping elements 6, 6a. The chains in this embodiment are roller chains, comprising inner link plates 511, 521, outer link plates 512, 522, pins 513, 523 and rollers 514, 524. The longitudinal direction L is defined by the direction of the movement of the chains 51, 52 and is indicated with an arrow L in FIG. 2. As can be seen in FIG. 2, the members of the first chain 51 with respect to those of the second chain 52 are offset to each other by half a pitch P.

The damping elements 6, 6a are fixed to an outer link plate 512 of the first chain 51 by a first fixation 61 and are fixed to an outer link plate 522 of the second chain 52 by a second fixation 62. Additionally, a first flap 64 adjoining the first fixation 61 abuts on an adjoining pin 513 protruding the outer link plate 522 of the first chain 51, the first fixation 61 is attached on and a second flap 65 adjoining the second fixation 62 abuts on a corresponding pin 523 of the second chain 52.

Figure 3:
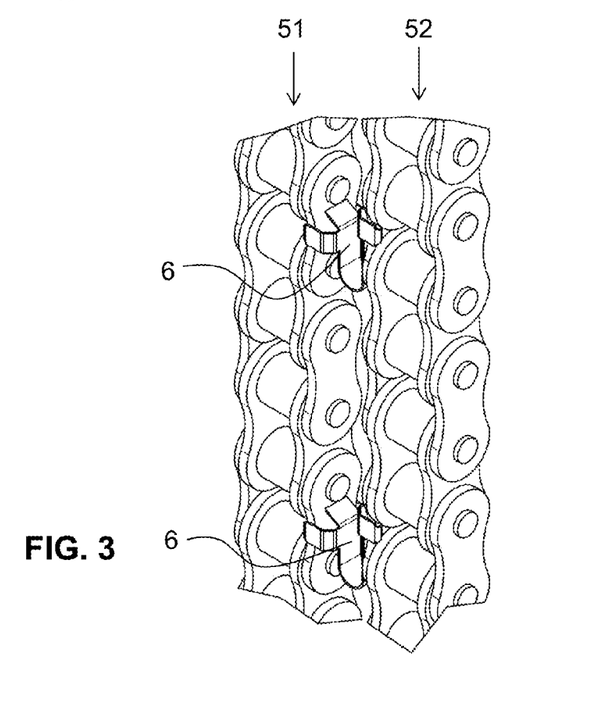
FIG. 3 is a perspective view of the chains and the damping elements of FIG. 2.
Figure 4:
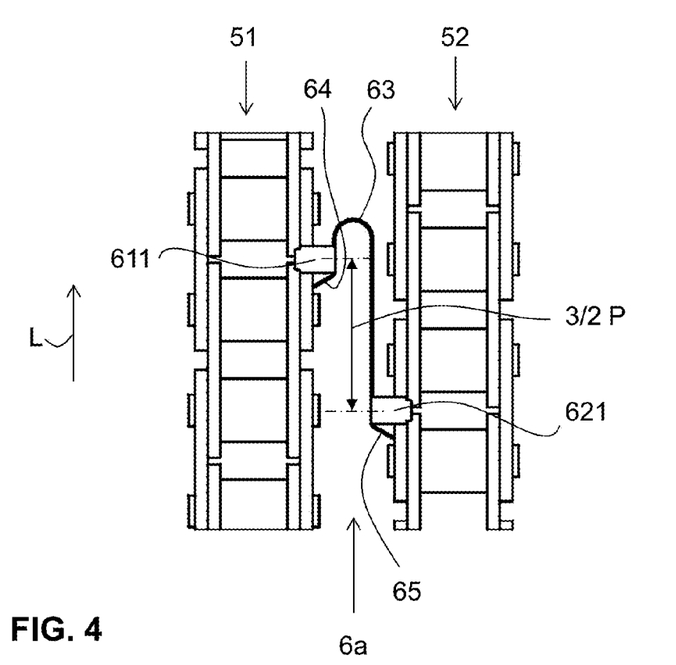
FIG. 4 is a front view of a second embodiment of the chains and the damping elements of a chain drive unit according to the invention.
Figure 5:
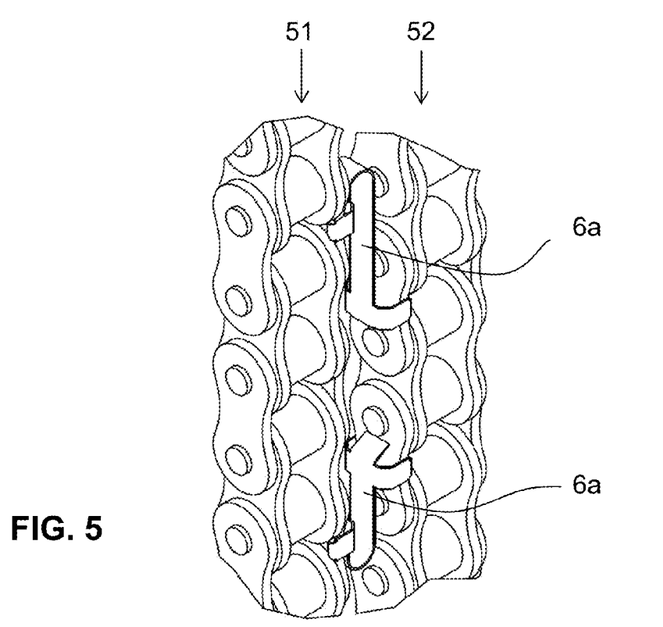
FIG. 5 is a perspective view of the chains and the damping elements of FIG. 4.

The difference between a first embodiment of a damping element 6, as shown in FIGS. 2 and 3, and a second embodiment of a damping element 6a, as shown in FIGS. 4 and 5, is the different distance in the longitudinal direction L of the first fixation 61 to the second fixation 62. The distance of the first embodiment is half a pitch P and the one of the second embodiment is one and a half pitch P.

Figure 6:
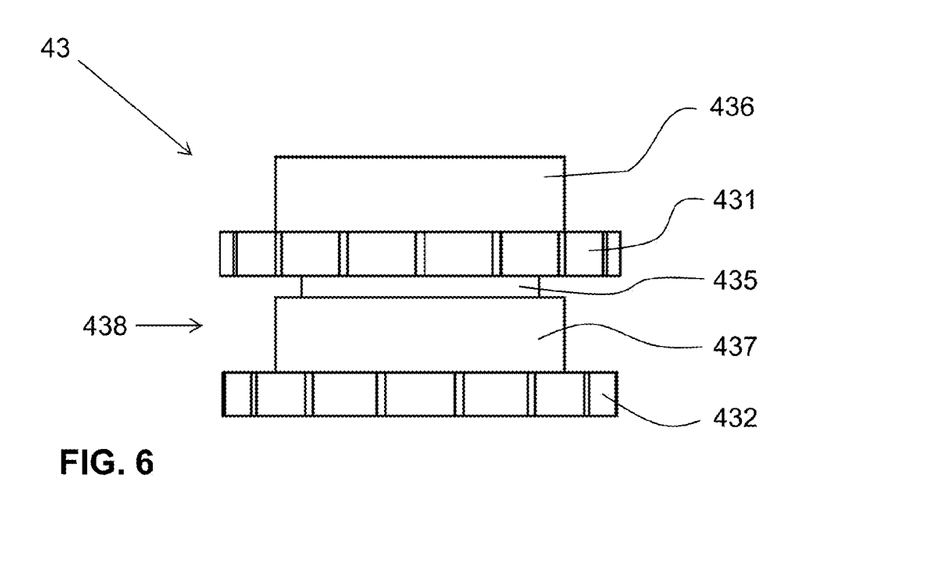
FIG. 6 is a top view of a chain wheel unit of the chain drive unit according to the invention.
Figure 7:
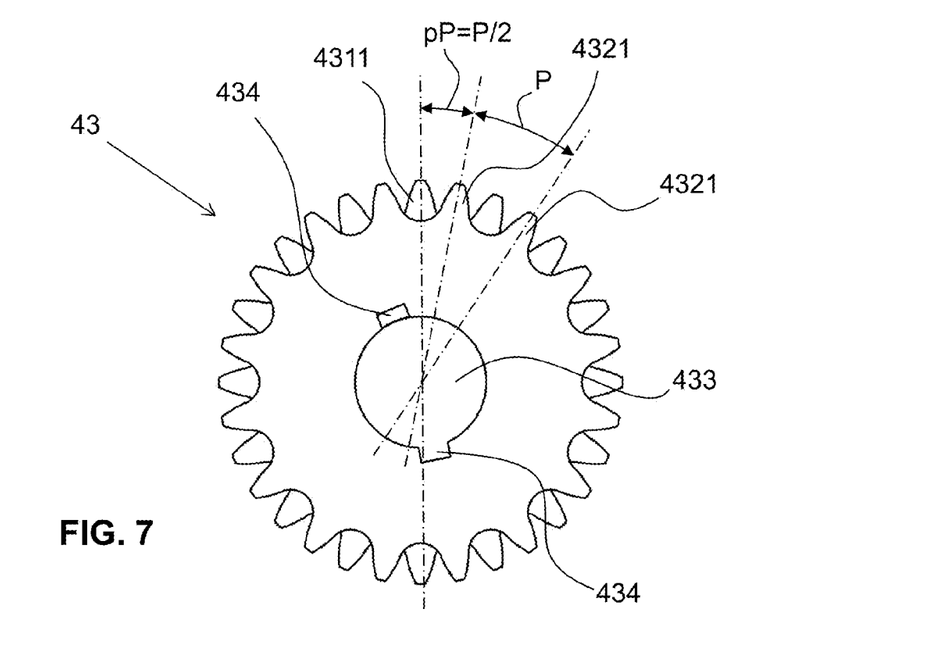
FIG. 7 is a front view of the chain wheel unit of FIG. 6.
Figure 8:
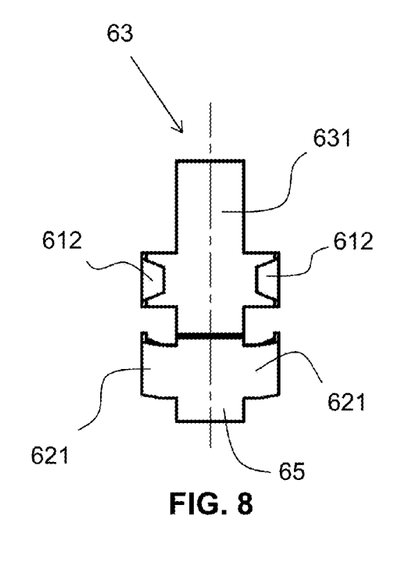
FIG. 8 is a side view of a first embodiment of a damping element of the chain drive unit according to the invention.
Figure 9:
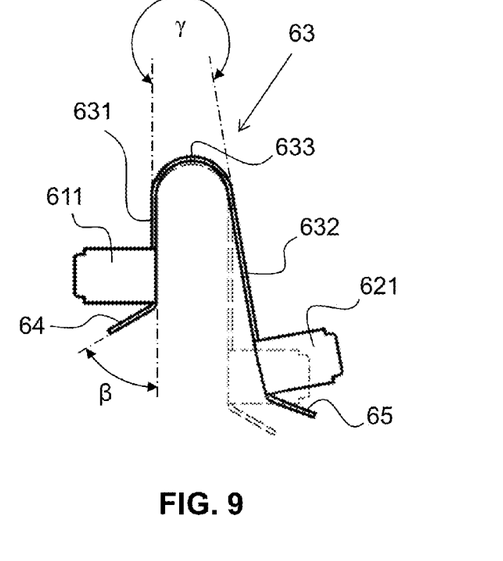
FIG. 9 is a front view of the damping element of FIG. 8.

FIGS. 6 and 7 show a chain wheel unit 43 of a drive unit according to the invention. The chain wheel unit 43 comprises a first sprocket 431, a second sprocket 432 and a spacer 435, all being arranged on a common rotation axle. Each of the sprocket 431, 432 comprises identical teeth 4311, 4321. The circumferential orientation of the two adjoining sprockets 431, 432 differs by half a pitch P, i.e. one tooth 4311 of the first sprocket 431 is circumferentially offset to one tooth 4321 of the second sprocket 432 by half a pitch. In this embodiment, two identical chain wheels, comprising identical sprockets 431, 432 and identical anti-twist devices 434 are being used. In this embodiment, the anti-twist device comprises individual fitting keys for each of the sprockets. Other embodiments with aligned cavities for inserting a common fitting key or other shaft to collar connections are also possible that ensure a solid rotational connection. The spacer 435 provides a means to adjust the axial distance between the first and the second sprocket.

In this embodiment, the spacer 435 together with a shaft part 437 of the second sprocket 432 form an intermediate space 438 adapted to receive the damping elements.

As shown in FIG. 7, the pitch P of a sprocket is defined as the circumferential distance between two adjoining teeth 4311, 4321.

FIGS. 8 to 11 show the first embodiment of a damping element according to the invention in detail. However, the fixations 61, 62 on either free end of the damping element are similar or identical to the ones of the other embodiments. In essence, the damping element 6 is of a folded sheet metal design with a first fixation 61 on its one free end for the lateral fixation to the first chain 51, a second fixation 62 on its opposite free end for the lateral fixation to the second chain 52 and a force transmission unit 63 being arranged between the first and the second fixation transmitting an applied force from the first fixation 61 to the second fixation 62 and vice versa.

Figure 10:
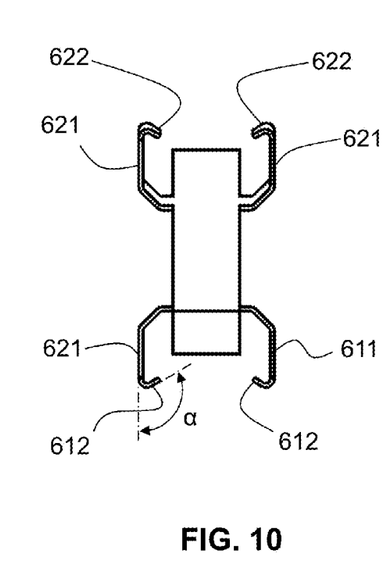
FIG. 10 is an opposite side view of the damping element of FIG. 8.
Figure 11:
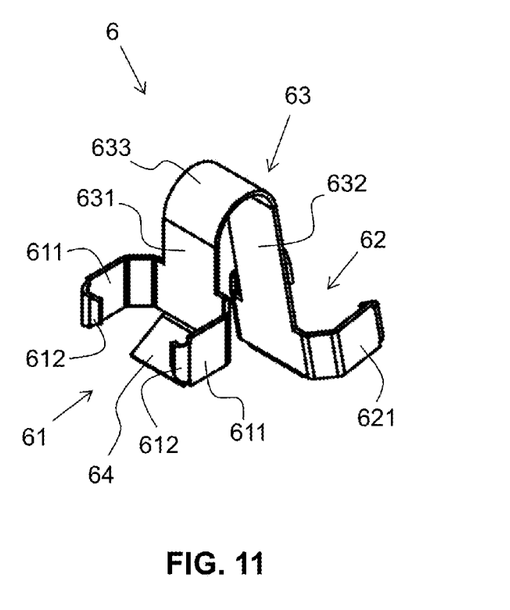
FIG. 11 is a perspective view of the damping element of FIG. 8.

The first fixation 61 in this embodiment is a clip with two opposing clamping jaws 611 for clamping an outer link plate 512 of the first chain 51 between the two rollers 514 being supported by said outer link plate 512 and between the two adjoining inner link plates 511 on either side of said outer link plate 512. At the free end of each of the clamping jaws 611, hooks 612 are being formed to better clench said outer link plate 512. For a better application, the hooks 612 are tapered and narrow towards their extremities. As can be seen in FIG. 10, the hooks 612 are realized by bending the end tip of the clamping jaws 611 by a hook angle α of more than 90 degrees in the direction of the opposite clamping jaw.

From the part of the first clip 61 connecting the two adjoining clamping jaws 611 the clamping jaws 611 extend in essence perpendicular to said connecting part. A first flap 64 extends inclined from said part in the same direction from said part as the clamping jaws 611 extend from said part, forming a flap angle β. Said flap angel, in the current embodiment is around 60 degrees, however, other, smaller or larger angles are possible.

The second fixation 62 is of identical design and the force transmission unit 63 in this embodiment is a leaf spring, in particular an arc-shaped leaf spring comprising a short arm 631, a long arm 632 and an arc 633 arranged in between these arms. In the depicted embodiment, the length of the short arm 631 and the long arm 632 differs by half a pitch. In other embodiments, said length differs by (2*n+1) times half a pitch, wherein n is an integer.

In order to realise a pretension between the first and the second chain, the arc-shaped leaf spring 63 is bent by a pretension angle γ of less than 180 degrees. When the damping element 6 is positioned between the two adjoining chains, the two free ends of the damping element are pressed together resulting in an outward directed clamping force.

In order to produce a damping element 6 as described above, a flat projection of the damping element body can be cut out of a steel sheet, representing a base plane. The clamping jaws and the adjoining flap forming a cross-like shape on either free end of said cut out body. In one step, the clamping jaws are bent in essence perpendicular to the base plane. In another step, the tips of the clamping jaws are bent inwards towards each other by a hook angle α of more than 90 degrees, in particular by 120 degrees. In another step, the flaps are bent towards the same direction as the clamping jaws by a flap angle β of around 60 degrees. The above described steps can be performed at the same time on both free ends of the damping element. In a last step, the middle section of the flat projection is bent by a pretension angle γ of less than 180 degrees, as such that the clamping jaws together with the flaps are oriented towards the outside.

Figure 12:
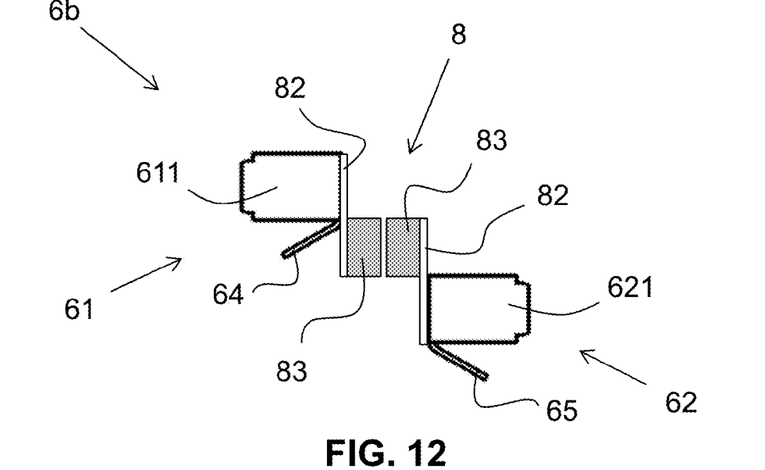
FIG. 12 is a front view of a second embodiment of a damping element of the chain drive unit according to the invention.

FIG. 12 shows a third embodiment of a damping element 6b. In essence, the attachment of the damping element to the respective chain is identical to the first embodiment, i.e. the clamping jaws and the flaps. Instead of an arc-shaped leaf spring 63 connecting the first and the second connection, a magnet unit 8 is present. In use, the magnets 83 can be in contact with each other or they can be spaced apart from one another.

The magnet unit 8 comprises magnet holders 82 and magnets 83. The magnet holders 82 can be formed integrally as a single piece together with the clamping jaws and the flaps or can be attached to them. The magnets 83 are attached to the magnet holders 82 or can be directly attached to the clamping jaws and flaps. In the depicted embodiment, the first fixation 61 together with a first magnet holder 82 and a first magnet 83 are identical to the second fixation 62 together with a second magnet holder 82 and a second magnet 83.

Figure 13:
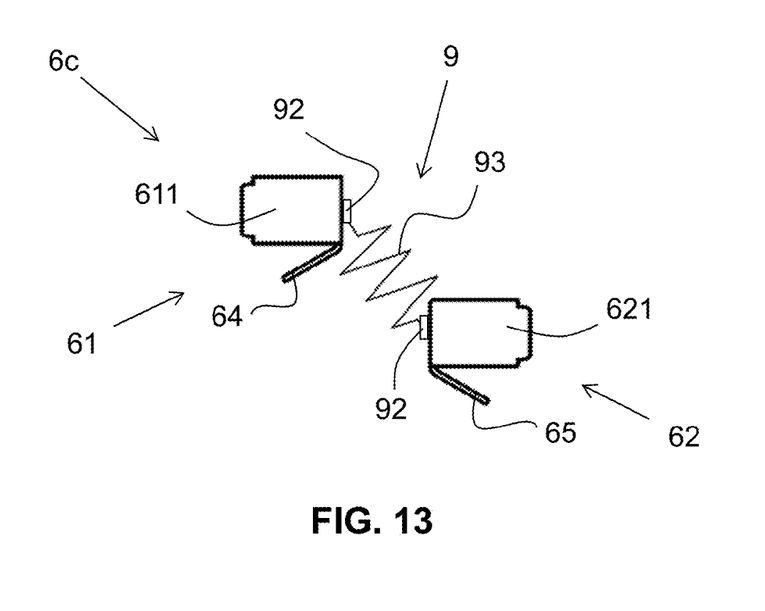
FIG. 13 is a front view of a third embodiment of a damping element of the chain drive unit according to the invention.

FIG. 13 shows a fourth embodiment of a damping element 6c. Like the third embodiment 6b, the clamping jaws and the flaps are identical to the ones of the first embodiment. In order to transmit forces from the first fixation 61 to a second fixation 62, a tension or pressure spring unit 9 is present.

The tension or pressure spring unit 9 comprises spring holders 92 and springs 93. A single spring or a plurality of springs can be present. The spring holders 92 can be formed integrally as a single piece together with the clamping jaws and the flaps or can be attached to them. The springs 93 are attached to the spring holders 92 or can be directly attached to the clamping jaws and flaps. In the depicted embodiment, the first fixation 61 together with a first spring holder 92 are identical to the second fixation 62 together with a second spring holder 92.

Figure 14:
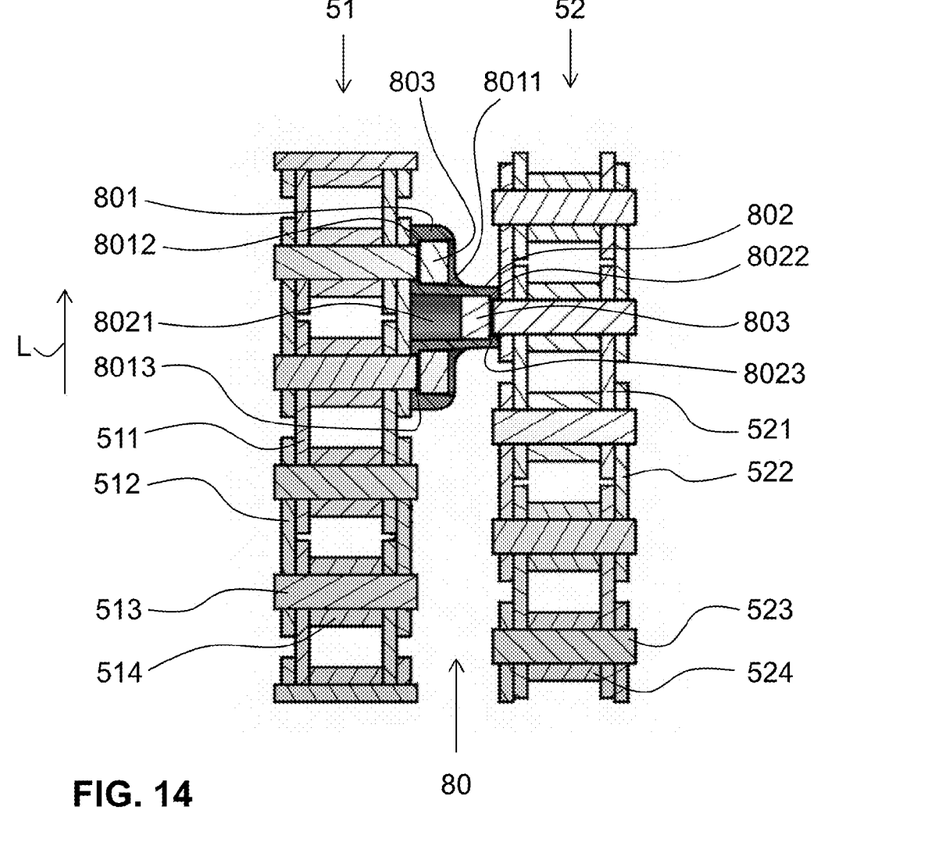
FIG. 14 is a frontal section view through the pins of a chain with a fourth embodiment of a damping element of the chain drive unit according to the invention.
Figure 15:
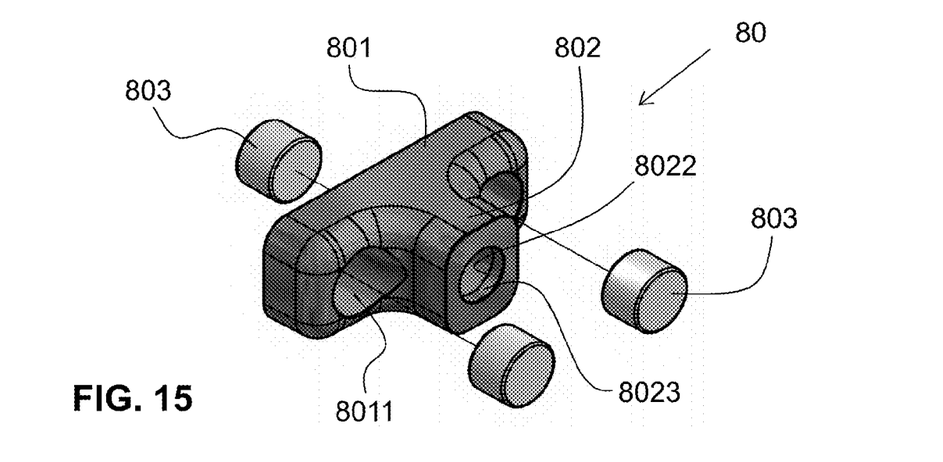
FIG. 15 is a perspective view of the damping element of FIG. 14.

FIGS. 14 and 15 show a fourth embodiment of a damping element 80. The damping element 80 comprises an integrally formed housing 800, being T-shaped in essence. In the view of FIG. 14, in the use situation, the housing looks like a lying T. The housing 800 comprising a first leg, forming the first fixation 801, is oriented parallel to the first chain 51 in the use situation. A second leg, forming the second fixation 802, is oriented perpendicular to the first leg and arranged in the middle thereof, extending in the direction of the second chain 52 in the use situation. On the first fixation 801, in the direction that is opposite of the second fixation 802, a first pin reception 8013 is present on either free end of the first leg facing laterally towards the first chain.

The first pin reception 8013 comprises a cylindrical shape and its diameter is slightly bigger than the pin 513 of the chain 51 to be received, providing some clearance between the respective pin and the corresponding side wall of the first pin reception 8013. The distance between these two first pin receptions 8013 matches the pitch of the first chain 51.

Adjoining to the first pin reception 8013 and collinear with its rotational axle, a first magnet reception 8011 is formed in the first leg and is adapted to receive a magnet 803, that can be inserted from the side opposite to the first pin reception 8013. The first magnet reception 8011, in essence, comprises a cylindrical shape that widens conically from a base diameter, arranged adjacent to the first pin reception 8013, towards the direction opposite to the first pin reception 8013. The base diameter matches the diameter of a magnet to be inserted towards. The difference in diameter of the first pin reception 8013 and the first magnet reception 8011 forms a first shoulder 8012, on which the corresponding magnet 803 abuts.

In the middle of the two first pin receptions 8013, in the direction of the second leg, a second magnet reception 8021 is formed and a second pin reception 8023 is formed adjacent and collinear thereto. The shape and design of the second magnet reception 8021 and the second pin reception 8013 are in essence equal to the first magnet reception 8011 respective the first pin reception 8013, being oriented towards the opposite direction. The difference in diameter of the second pin reception 8023 and the second magnet reception 8021 forms a second shoulder 8022, on which the corresponding magnet 803 abuts.

In this embodiment, the second fixation 802 comprises only one second pin reception 8013. However, other embodiments with more than one second pin reception are possible, resulting in a damping element, whose shape differs from the T-shape.

I claim:

1. A chain drive unit for reducing chain vibrations comprising a chain wheel unit with at least two sprockets that are arranged parallel on a common rotation axle, at least two parallel chains engaging these sprockets, wherein at least one damping element connecting two adjoining chains and wherein the circumferential orientation of two adjoining sprockets differs by a partial pitch, and wherein the damping element comprises a first fixation on its one free end for the lateral fixation to the first chain, a second fixation on its opposite free end for the lateral fixation to the second chain and a force transmission unit arranged between the first and the second fixation transmitting an applied force from the first fixation to the second fixation and vice versa, wherein the first fixation comprises a first clip with two opposing clamping jaws for clamping an outer link plate of the first chain, wherein each of the two opposing clamping jaws of the first clip comprises a free end, wherein a hook is formed at each of these free ends and the second fixation comprises a second clip with two opposing clamping jaws for clamping an outer link plate of the second chain, wherein each of the two opposing clamping jaws of the second clip comprises a free end, wherein a hook is formed at each of these free ends, wherein the hooks of the first clip as well as the hooks of the second clip clench the respective outer link plate.

2. The chain drive unit according to claim 1, wherein the partial pitch is defined by a sprocket's pitch divided by the number of sprockets.

3. The chain drive unit according to claim 1, wherein the position of the first fixation differs to the position of the second fixation in a longitudinal direction of the chain's movement by the partial pitch or by (the number of sprockets*n+1) times the partial pitch, wherein n is an integer.

4. The chain drive unit according to claim 1, wherein the force transmission unit comprises an arc-shape leaf spring or a magnet or a tension or pressure spring as elastic element.

5. The chain drive unit according to claim 1, wherein the damping element further comprise a flap on its free ends adjacent to the opposing clamping jaws of the first and second clips, wherein each of the flaps is oriented inclined in a longitudinal direction of the corresponding chain for abutting in a longitudinal direction against an adjacent pin of the corresponding chain.

6. The chain drive unit according to claim 1, wherein the chains are roller chains.

7. A lifting system with a chain drive unit according to claim 1, wherein the lifting system further comprises a holding frame with guiding elements arranged thereon for the guiding of a lifting element arranged thereon and a weight compensation, wherein the lifting element is connected to the weight compensation by means of the chain drive unit, wherein the first fixation comprises a first clip with two opposing clamping jaws for clamping an outer link plate of the first chain, wherein each of the two opposing clamping jaws of the first clip comprises a free end, wherein a hook is formed at each of these free ends and the second fixation comprises a second clip with two opposing clamping jaws for clamping an outer link plate of the second chain, wherein each of the two opposing clamping jaws of the second clip comprises a free end, wherein a hook is formed at each of these free ends, wherein the hooks of the first clip as well as the hooks of the second clip clench the respective outer link plate.

8. The lifting system according to claim 7, wherein the chain drive unit is arranged on top of the holding frame.

9. The lifting system according to claim 7, wherein the damping element further comprise a flap on its free ends adjacent to the opposing clamping jaws of the first and second clips, wherein each of the flaps is oriented inclined in a longitudinal direction of the corresponding chain for abutting in a longitudinal direction against an adjacent pin of the corresponding chain.

10. A damping element to be used in a chain drive unit, wherein the damping element comprises a first fixation on its one free end for the lateral fixation to the first chain, a second fixation on its opposite free end for the lateral fixation to the second chain and a force transmission unit arranged between the first and the second fixation transmitting an applied force from the first fixation to the second fixation and vice versa, wherein the first fixation comprises a first clip with two opposing clamping jaws for clamping an outer link plate of the first chain, wherein each of the two opposing clamping jaws of the first clip comprises a free end, wherein a hook is formed at each of these free ends and the second fixation comprises a second clip with two opposing clamping jaws for clamping an outer link plate of the second chain, wherein each of the two opposing clamping jaws of the second clip comprises a free end, wherein a hook is formed at each of these free ends, wherein the hooks of the first clip as well as the hooks of the second clip clench the respective outer link plate.

11. The damping element according to claim 10, wherein the force transmission unit comprises an arc-shape leaf spring or a magnet or a tension or pressure spring as elastic element.

12. The damping element according to claim 10, further comprising a flap on its free ends adjacent to the opposing clamping jaws of the first and second clips, wherein each of the flaps is oriented inclined in a longitudinal direction of the corresponding chain for abutting in a longitudinal direction against an adjacent pin of the corresponding chain.

13. A method for reducing chain vibrations within a chain drive unit comprising: providing a chain wheel unit with at least two sprockets that are arranged parallel on a common rotation axle with a circumferential orientation of two adjoining sprockets differing by a partial pitch, providing at least two parallel chains engaging the sprockets of the chain wheel unit, providing a plurality of damping elements having free ends with fixations, attaching the fixations of the free ends of each damping element on opposite adjacent portions of the two parallel chains for connecting these two adjoining chains, wherein a force transmission unit is arranged between the first and the second fixation transmitting an applied force from the first fixation to the second fixation and vice versa and, wherein the first fixation comprises a first clip with two opposing clamping jaws for clamping an outer link plate of the first chain, wherein each of the two opposing clamping jaws of the first clip comprises a free end, wherein a hook is formed at each of these free ends and the second fixation comprises a second clip with two opposing clamping jaws for clamping an outer link plate of the second chain, wherein each of the two opposing clamping jaws of the second clip comprises a free end, wherein a hook is formed at each of these free ends, wherein the hooks of the first clip as well as the hooks of the second clip clench the respective outer link plate.

14. The method according to claim 13, wherein the partial pitch is defined by a sprocket's pitch divided by the number of sprockets.

* * * * *